US008472595B1

(12) United States Patent
Henderson

(10) Patent No.: US 8,472,595 B1
(45) Date of Patent: *Jun. 25, 2013

(54) METHOD AND APPARATUS FOR PROVIDING A WIRELESS PORTABLE COMMUNICATION DEVICE WITH THE ABILITY TO SELECTIVELY DISPLAY PICTURE AND VIDEO IMAGES

(75) Inventor: Daniel A. Henderson, Fort Worth, TX (US)

(73) Assignee: Intellect Wireless, Inc

( * ) Notice: Subject to any disclaimer, the term of this patent is extended or adjusted under 35 U.S.C. 154(b) by 0 days.

This patent is subject to a terminal disclaimer.

(21) Appl. No.: 13/385,664

(22) Filed: Feb. 29, 2012

Related U.S. Application Data

(60) Division of application No. 12/380,320, filed on Feb. 26, 2009, now Pat. No. 8,160,221, which is a division of application No. 11/059,121, filed on Feb. 16, 2005, now abandoned, which is a division of application No. 10/033,824, filed on Dec. 19, 2001, now Pat. No. 7,266,186, which is a continuation of application No. 08/726,024, filed on Oct. 4, 1996, now Pat. No. 7,426,264, which is a continuation-in-part of application No. 08/177,851, filed on Jan. 5, 1994, now Pat. No. 6,278,862.

(60) Provisional application No. 60/005,029, filed on Oct. 6, 1995.

(51) Int. Cl.
*H04M 11/00* (2006.01)

(52) U.S. Cl.
USPC .................................. 379/93.17; 379/142.04

(58) Field of Classification Search
USPC ............. 455/466; 379/67.1, 68, 88.11, 88.13, 379/88.12, 88.19, 142.04, 142.05, 142.06, 379/93.17
See application file for complete search history.

(56) References Cited

U.S. PATENT DOCUMENTS

| 4,747,122 A | 5/1988 | Bhagat et al. |
| 4,788,711 A | 11/1988 | Nasco |
| 4,805,094 A | 2/1989 | Oye |
| 4,924,480 A | 5/1990 | Gay |
| 4,994,797 A * | 2/1991 | Breeden ...................... 340/7.28 |
| 5,144,661 A | 9/1992 | Shamosh et al. |

(Continued)

FOREIGN PATENT DOCUMENTS

| EP | 0436345 | 12/1990 |
| EP | 0436345 | 7/1991 |

(Continued)

OTHER PUBLICATIONS

*Intellect Wireless, Inc.* v. *HTC Corporation*, No. 09 C 2945, U.S.D.C. for the Northern District of Illinois Eastern Division, Findings of Fact, Conclusions of Law and Order.

(Continued)

*Primary Examiner* — Olisa Anwah
(74) *Attorney, Agent, or Firm* — Law Office of Scott C Harris, Inc

(57) ABSTRACT

Unwanted picture or video images are inhibited from being displayed by wireless communication devices based on the identity of the message originator, be that identity a phone number, an e-mail address, a website, a blocked message originator identification signal, the absence of a message originator identifier associated with the wireless picture message, or an electronic serial number of the message originator's device.

31 Claims, 9 Drawing Sheets

U.S. PATENT DOCUMENTS

| | | | |
|---|---|---|---|
| 5,148,485 A | | 9/1992 | Dent |
| 5,412,708 A | | 5/1995 | Katz |
| 5,426,594 A | * | 6/1995 | Wright et al. .................. 709/206 |
| 5,446,678 A | * | 8/1995 | Saltzstein et al. ............. 709/246 |
| 5,452,356 A | * | 9/1995 | Albert ........................... 380/271 |
| 5,481,255 A | | 1/1996 | Albert |
| 5,764,731 A | | 6/1998 | Yablon |

FOREIGN PATENT DOCUMENTS

| | | |
|---|---|---|
| EP | 0411385 | 8/1991 |
| EP | 0441385 | 8/1991 |
| JP | 62212792 | 9/1987 |
| JP | 2046028 | 2/1990 |
| JP | 3273718 | 12/1991 |
| JP | 5130253 | 5/1993 |
| JP | 543653 | 6/1993 |
| WO | 9209178 | 5/1992 |

OTHER PUBLICATIONS

Request to Review.
Reexamination Control No. 95/001,814.
Reexamination Control No. 90/012,072.
Reexamination control No. 95/001,777.
Findings of Fact, Conclusions of Law, and Order—US District Ct. No. District Case 09-CV-2945 Sep. 6, 2012.
Brief of Plaintiff-AppelantIntellect Wireless, Inc. Appeal from Case 09-CV-2945 to CAFC CAFC Appeal No. 2012-1658 Jan. 11, 2013.
Brief of Defendant-Appelees HTC Corp and HTC America, Inc , Appeal from case 09-CV-2945 CAFC. CAFC Appeal No. 2012-1658 Mar. 18, 2013.

* cited by examiner

METHOD AND APPARATUS FOR PROVIDING A WIRELESS PORTABLE COMMUNICATION DEVICE WITH THE ABILITY TO SELECTIVELY DISPLAY PICTURE AND VIDEO IMAGES

RELATED APPLICATIONS

This application is a division of U.S. patent application Ser. No. 12/380,320 filed Feb. 26, 2009 now U.S. Pat. No. 8,160,221, which is a division of U.S. patent application Ser. No. 11/059,121 filed Feb. 16, 2005 now abandoned, which is a division of U.S. patent application Ser. No. 10/033,824 filed Dec. 19, 2001 now U.S. Pat. No. 7,266,186, which is a continuation of U.S. patent application Ser. No. 08/726,024 filed Oct. 4, 1996 now U.S. Pat. No. 7,426,264, which claims rights under 35USC119 to Provisional Patent Application 60/005,029 filed Oct. 6, 1995, and is a continuation-in-part of U.S. patent application Ser. No. 08/177,851 filed Jan. 5, 1994 now U.S. Pat. No. 6,278,862, the contents of which are incorporated herein by reference.

FIELD OF THE INVENTION

This invention relates to wireless devices and more particularly to the ability to eliminate the display of unwanted picture and video images.

BACKGROUND OF THE INVENTION

With the advent of wireless devices and more particularly advanced cellular phones, laptop computers, PDAs and wireless picture frames, there is a necessity to prevent unwanted wireless video and picture images from being displayed. These video images for instance can be from unknown sources or can contain objectionable material such as advertising or pornographic material. Access via wireless links to various devices that can display such images permits access to these devices from websites, cellular phones, cameras, computers or computer tablets including PDAs which information is pushed from these devices to the particular wireless device. In today's parlance these unwanted messages are called spam.

These unwanted messages and data are described by the inventor hereof in his prior patents and patent applications. In co-pending application Ser. No. 11/134,669 filed May 19, 2005, claiming rights under 35USC119 to Provisional Application Ser. No. 60/005,029 filed Oct. 6, 1995, as early as 1995 the ability to selectively display picture data based on the identity of the entity transmitting the data is described. The entity transmitting the data, i.e. the message originator, is identified either alphanumerically as by a telephone number or by other identifying means such as e-mail addresses, device serial numbers and websites.

It is noted that in this patent application Caller ID is utilized to identify the message originator noting that while the above noted application was primarily presented in a paging or cellular environment, the identity of the calling party along with any optional data message such as a voice, text or image message were to be received by the called party's personal communicator.

In the present context the called party's personal communicator is a wireless phone, PDA, wireless picture frame, computer or other device which obtains the picture and video image wirelessly.

Clearly identified in this patent application were the existence of telephone numbers, e-mail addresses or the like to provide message originator identity.

Note that in this prior patent application, the recipient could determine in advance at a message center or from within the wireless device which message originators they wish to receive wireless picture or video messages from. Any message originators not having the identity that matches the pre-stored preferences at the message center or from within the wireless device would not be able to cause a signal to be transmitted or displayed.

In the context of the subject invention, if the signal is not transmitted or transmittable then the unwanted message is not displayed.

Note in the above patent application that e-mail information received at a message center could be used alternatively as caller identifying information, with FIGS. 6A and 6B summarizing one embodiment of this concept.

Key to the ability to eliminate unwanted wireless picture and video in this early patent application is the coincidence detection within a message center in which picture and video data could be selectively transmitted to the message recipient based on a comparator at the message center that analyzes the source identity of the message originator with pre-stored user preferences determined in advance by the message recipient.

Moreover, coincidence detection was said to be available within a wireless portable communication device in which data representative of the identity of the message originator could be used at the portable communication device of the message recipient. In this case the wireless portable communication device would employ a coincidence detector that generates a number of notification events in response to a match with pre-stored data or user preferences compared against the caller identity data received. It is said in this patent application that a coincidence detection could inhibit any associated message transmitted from a message center from being reviewed by the message recipient at the personal communicator device.

What is therefore eminently understandable is that as early as 1995 the patent application from which this application derives its early filing date described what is now known as spam filtering in wireless devices, especially as it relates to video and picture images.

With the advent of disparate personal communication devices such as wireless picture frames which are viewable by many, or in fact by the transmission of videos and picture images to wireless phones, it is important that the user of the wireless phone be able to eliminate unwanted pictures and video. It is also important to be able to provide a mechanism by which someone in authority can limit, for instance the transmission of pornographic information to selected recipients, which pornographic or advertising information can be generated from those unknown to the recipient, such as from websites and from spammers who broadcast the offensive material to all of the cell phone numbers that they can identify.

Additionally, the dissemination of sexually explicit materials, now called "sexting" has reached proportions which are alarming to parents and authorities who wish to protect children from the harmful effects of pornographic information being transmitted to their individual wireless devices. Additionally, adults may not wish to have this offensive or objectionable material sent to their devices both because it is unwanted in the sense of its content, and also because it is unwanted due to the frequency with which such picture and video messages are sent out. Thirdly, these images can constitute unwanted advertising.

Thus, with the advent of picture messaging there has been an increase in social problems related to this application, meaning that the sending of certain pictures and video has resulted in unwanted receipt of images by the recipient.

Taking for example a wireless picture frame that one wants to send a picture to, one has to have a device capable of sending a picture. That transmission that is ultimately sent or intended to be sent to the wireless picture frame of necessity includes at least two components. It will include the picture data itself and it will include some alphanumeric textual identifier that is typically either the phone number used or associated with the message originator, or an e-mail address that may or may not include phone number information. Moreover, it might be other information such as a website address or in fact the number associated with the device used in transmitting the images.

SUMMARY OF INVENTION

It is the purpose of the subject invention to take information that is associated with the picture or video image that identifies the message originator and to utilize this information to inhibit the display of picture or video image at the wireless communication device. In one embodiment inhibiting image display includes coincidence detection that may be contained within the wireless communication device, or can be used at a message center within the wireless network or elsewhere to inhibit unwanted images from being displayed on the wireless communication device.

As will be appreciated, coincidence detection can rely on rules that are established by the message recipient, either at his or her communication device or at a message center itself. Thus either at the wireless communication device or at the message center, it is the textual data associated with the picture or video data that is detected and is matched with pre-stored user preference data, which is in one embodiment a listing of undesirable message originators. When coincidence is detected then a transmission to the wireless communication device or display at the wireless communication device is selectively inhibited.

There are two types of systems in which picture and video messages are transmitted wirelessly to a wireless device. The first uses a network which includes a message center that stores the picture or video message data and transmits it to the wireless communication device. Even in the case of streaming technologies, message centers operate as a buffer for the video or picture information.

On the other hand, it is possible to store the video or picture information in a computer and transmit it from the message originating computer to the wireless handset without going through a server. This includes Bluetooth systems and infrared systems which involve point-to-point communication.

Regardless of whether there is a message center or server involved, the picture and video images are tagged or associated in some manner with the message originator information.

Thus, if one can identify the source of the video or picture image one can inhibit it from being displayable at the wireless communication device. Such identity can be ascertained before the device displays the image by comparing the identification information with a preloaded list of acceptable message originators or alternatively a preloaded list of prohibited message originators.

In the case that a message center is employed, this message center can be a multimedia service message center or MMS message center, as described more fully in the 3GPP MMS Multimedia Messaging Service G. W. E Naël, Le Bodic, John Wiley & Sons LTD, 2003, incorporated herein by reference.

The MMS message center need not necessarily be on the wireless network, but can be for instance a Master MMS center at for instance a person's home or business which is then utilized to distribute via Bluetooth or 802.11 wireless communication the received image to various Slave devices that include wireless picture frames. Thus, one could for instance, at a given locale, have Master multimedia router or distributor at which the spam filtering provided by the subject invention can be housed. Thus, the Master multimedia device, which can display the images itself, can provide the inhibiting function, not only to the display of the images it receives, but also to inhibit images from being distributed.

Additionally, it is a feature of the subject invention that when the picture or picture message has no associated source identification information then either no picture messages are sent to the wireless device, or if sent, the wireless device is inhibited from displaying such picture or picture message.

In summary, unwanted picture or video images are inhibited from being displayed by wireless communication devices based on the identity of the message originator, be that identity a phone number, an e-mail address, a website, a blocked message originator identification signal, the absence of a message originator identifier associated with the wireless picture message, or an electronic serial number of the message originator's device.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
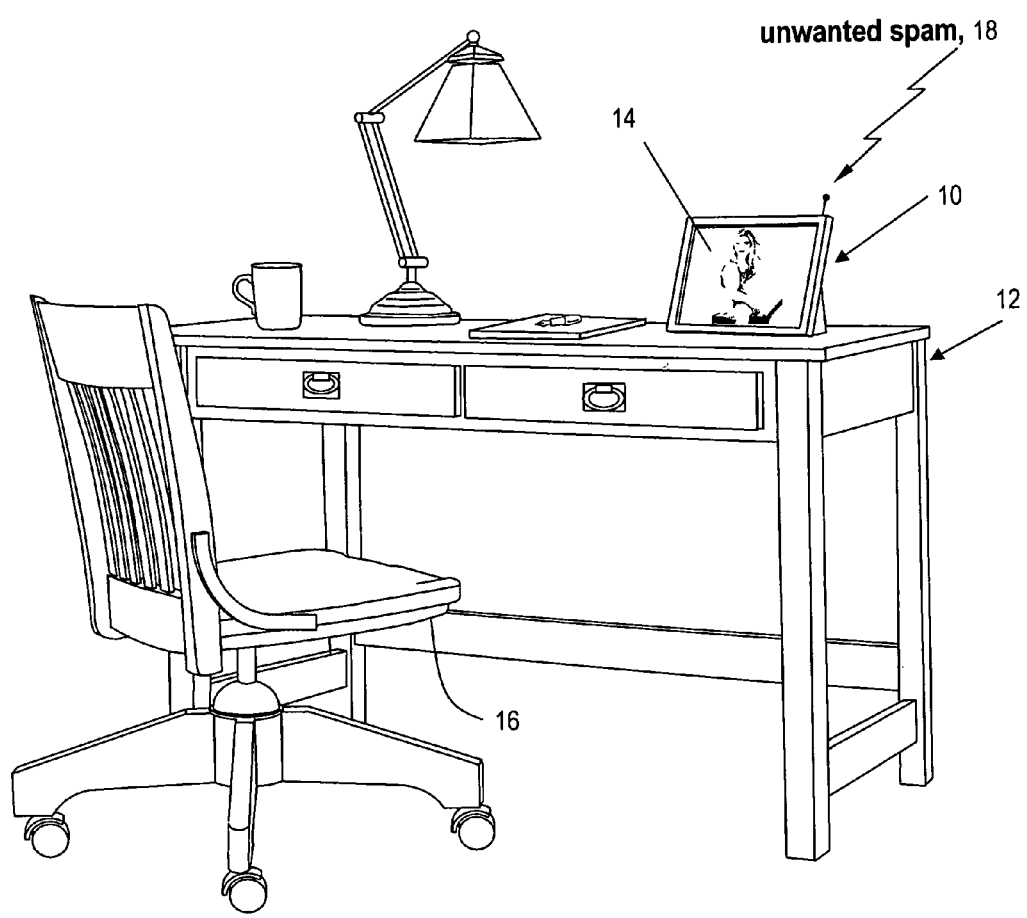
FIG. 1 is a diagrammatic illustration of the use of a wireless picture frame at an individual's desk indicating the receipt of an unwanted spam image at the picture frame.

Referring now to FIG. 1, a wireless picture frame 10 is shown on a desk 12 such that an image 14 is readily viewable by a person in a chair 16, or in fact by any one in the vicinity of the desk. In this case the screen displays unwanted spam which may be pornographic or otherwise undesirable. Note that having such pictures on a wireless picture frame may be embarrassing or offensive, or may pose other legal problems such as sexual harassment in a work environment.

Most notably wireless picture frames are susceptible to addressing by spammers in which unwanted spam 18 is transmitted to the wireless picture frame whereupon without control of the message recipient the image is displayed, much to the annoyance and/or embarrassment of the individual owning the picture frame.

While the subject system is described in connection with wireless picture frames, it will be appreciated that the receipt of unwanted picture or video images on any kind of device such as a wireless phone, PDA or the like can be both embarrassing and undesirable. Since the owner of such a device has no control over what is displayed on his device, such spamming is all the more objectionable.

There therefore needs to be a simple system under the control of the message recipient to limit or inhibit unwanted image spam from being displayed on his or her device.

Figure 2A:
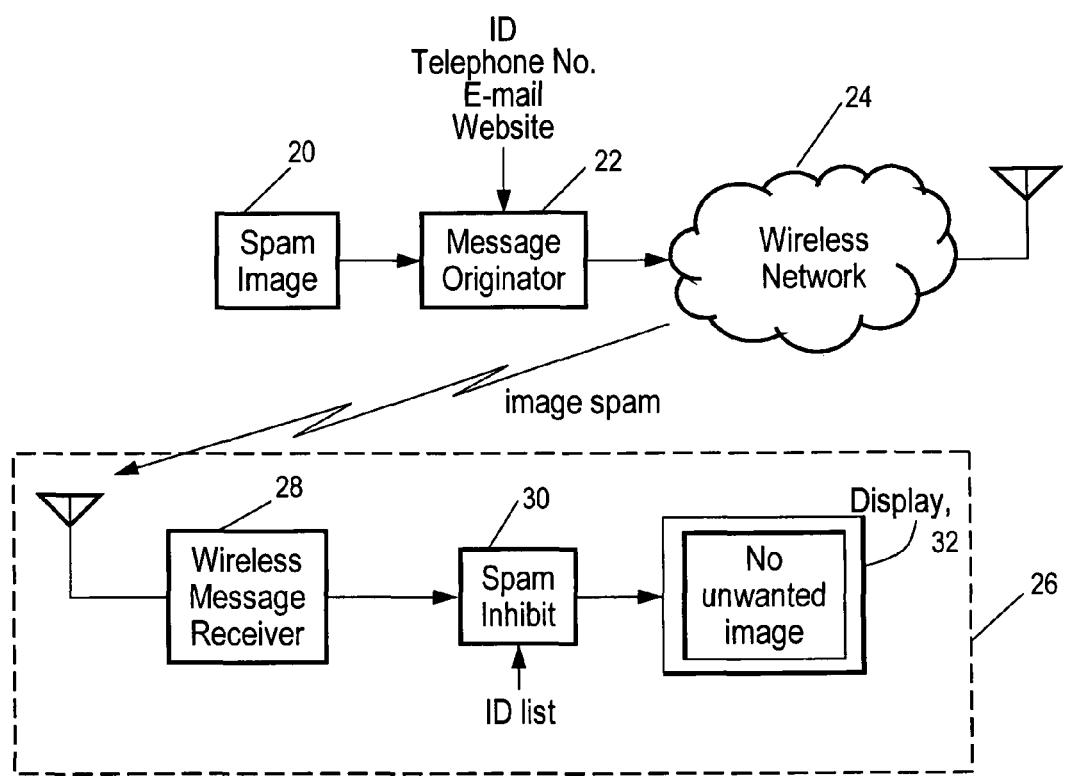
FIG. 2a is a diagrammatic illustration of the subject invention in which a spam inhibit filter is interposed between a wireless transceiver in a message recipient's wireless device and the display on the device for the purpose of inhibiting display of unwanted picture images through the utilization of an ID list created by the message recipient reflecting acceptable message originators, with a comparison between the message originator and the ID list resulting in the inhibiting of unwanted images when no match is found.

Referring now to FIG. 2a, in one embodiment a spam image 20 is generated by a message originator 22 whose identity is known because of his or her telephone number, email address, alphanumeric information or website address. When the spam image is transmitted to wireless network 24, that which is sent to the wireless network is not only the picture or video message, but also information corresponding to the identity of the source of the picture message, namely the message originator.

Under normal circumstances the picture is transmitted via the wireless network to a wireless device 26 that includes a wireless message receiver 28. The output of the message receiver is coupled to a spam filter 30 for inhibiting selected image spam. A preloaded ID list is coupled to filter 30 to identify which message originators are permitted to have their picture messages displayed. When wireless message receiver 28 attempts to output the picture message to a display 32, spam filter 30 inhibits or prohibits the transmission of the image spam to display 32 for those picture messages whose message originators do not match those in the ID list. As an alternative feature of the invention herein, the message recipient can be required to enter a security code or pin that will allow the inhibited picture message to be seen.

In this matter the spam filtering is accomplished at the recipient's device as opposed to being filtered at the network.

Figure 2B:
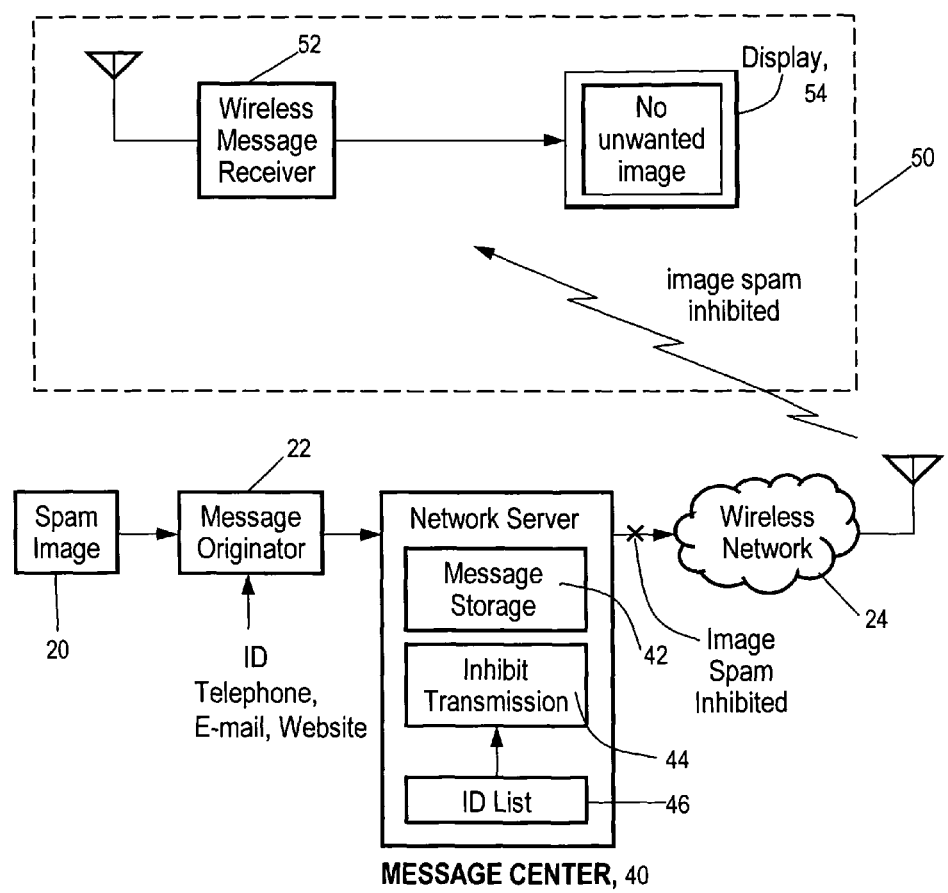
FIG. 2b is a diagrammatic illustration of the case in which a message center is involved showing the transmission of a spam image from a message originator to a message center which includes message storage and a filter for inhibiting the transmission of picture messages having originators which do not match with an ID list.

Referring now to FIG. 2b, the spam may be filtered at a message center 40 of a network or as shown in a message center as depicted elsewhere in the parent application this application claims the benefit of. In this case spam image 20 has an associated message originator 22 as before, with the spam image having an associated image source identifier or message originator ID in terms of a telephone number, email address, alphanumeric tag, or website address. A storage device 42 in the network server stores the picture message and a filter 44 inhibits the transmission or display of picture messages over wireless network 24 when the message originator identifier does not match those in a preloaded ID list 46, provided in one embodiment by the message recipient. Alternatively, a list of undesirable messages originator IDs may be provided. In this case an adaptation is contemplated in which only message originator identifiers that do match those in this undesirable id list result in the inhibiting of the transmission or display of the unwanted picture messages.

The network is therefore responsible for wirelessly transmitting all picture messages to wireless device 50, which in this case has a wireless message receiver 52 coupled directly to a display 54.

In this embodiment the message filtering or spam filtering is accomplished at the message center, such that with the provision by the message recipient of acceptable sources of picture data, it is the network that does the filtering as opposed to the wireless device.

What will be seen is that what is provided is a method of inhibiting the display of unwanted pictures, be they still pictures, icons, graphics or video through the utilization of a filtering function that inhibits the display of images the source of which does not match a preloaded ID list. As mentioned earlier, an alternative embodiment contemplates that the display of unwanted pictures may be inhibited upon a coincidence detection between the received picture message source identification data and a preloaded list of undesirable message originators, either at the message center or from within the wireless portable communication device. This preloaded list may be recipient-generated or may be generated in some other manner such as by networks or other authorities.

Figure 3:
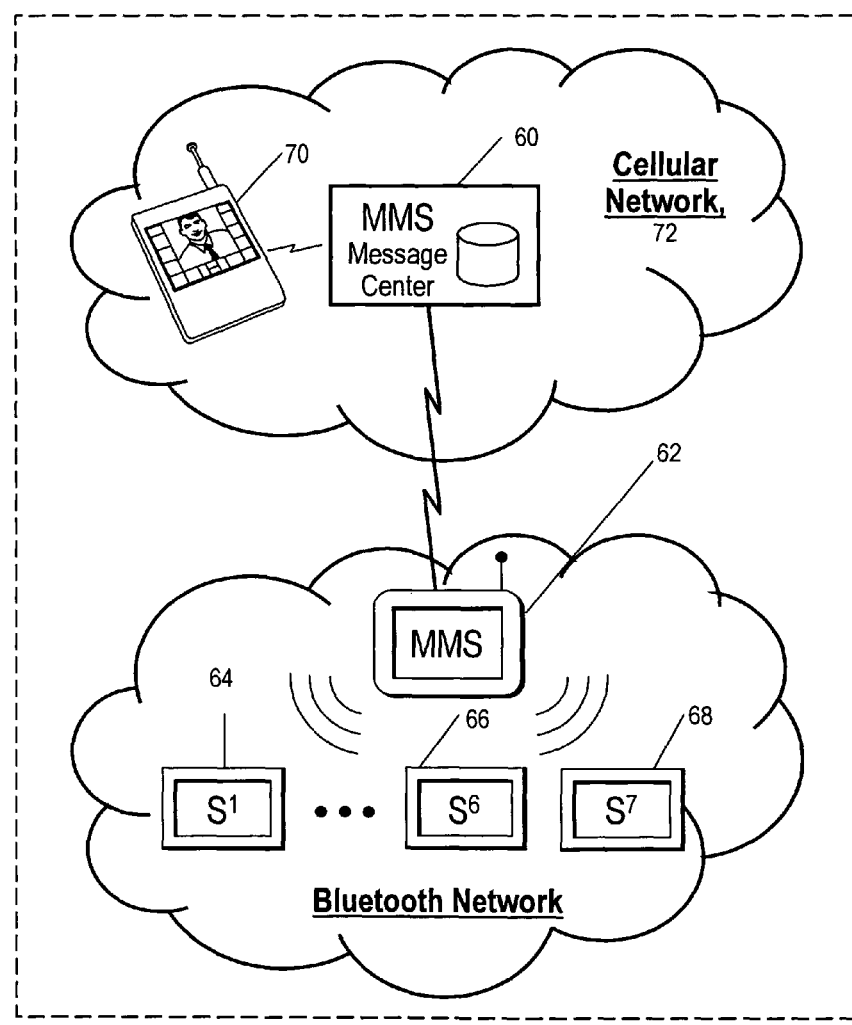
FIG. 3 is a diagrammatic illustration of a digital image network for wireless picture frames involving a message originator who transmits a picture message to a MMS message center within a cellular network, with the picture message being wirelessly transmitted, in one embodiment to a Master unit that in turn wirelessly transmits the picture image to a number of Slave devices, in one embodiment utilizing a Bluetooth network.

The subject system is especially useful in the prevention of unwanted pictures from arriving at digital picture frames. While digital picture frames may be direct coupled to a wireless network, in one embodiment and as shown in FIG. 3, an MMS message center 60 is wirelessly coupled to an MMS Master unit 62, which in turn relays any picture message traffic to a number of Slave units 64, 66 and 68, in one embodiment utilizing Bluetooth techniques. However, this Master/Slave relationship is not limited to Bluetooth transmissions, but may be for instance involve optically coupling or may use the 802.11 protocols.

The picture message inhibit system of FIGS. 2a and 2b may be installed at either at MMS server 60 or at an MMS Master unit 62, as well as for instance at Slave units 64, 66 and 68. With the subject system it is possible to eliminate unwanted pictures from being displayed when the pictures are transmitted over a wireless network to a device which can display the pictures.

Thus, as can be seen in FIG. 3, a picture phone 70 may be utilized to create or generate a picture message which is transmitted to an MMS message center 60 within a cellular network 72, with the message originator information being captured by the MMS message center from the picture phone.

Figure 4:
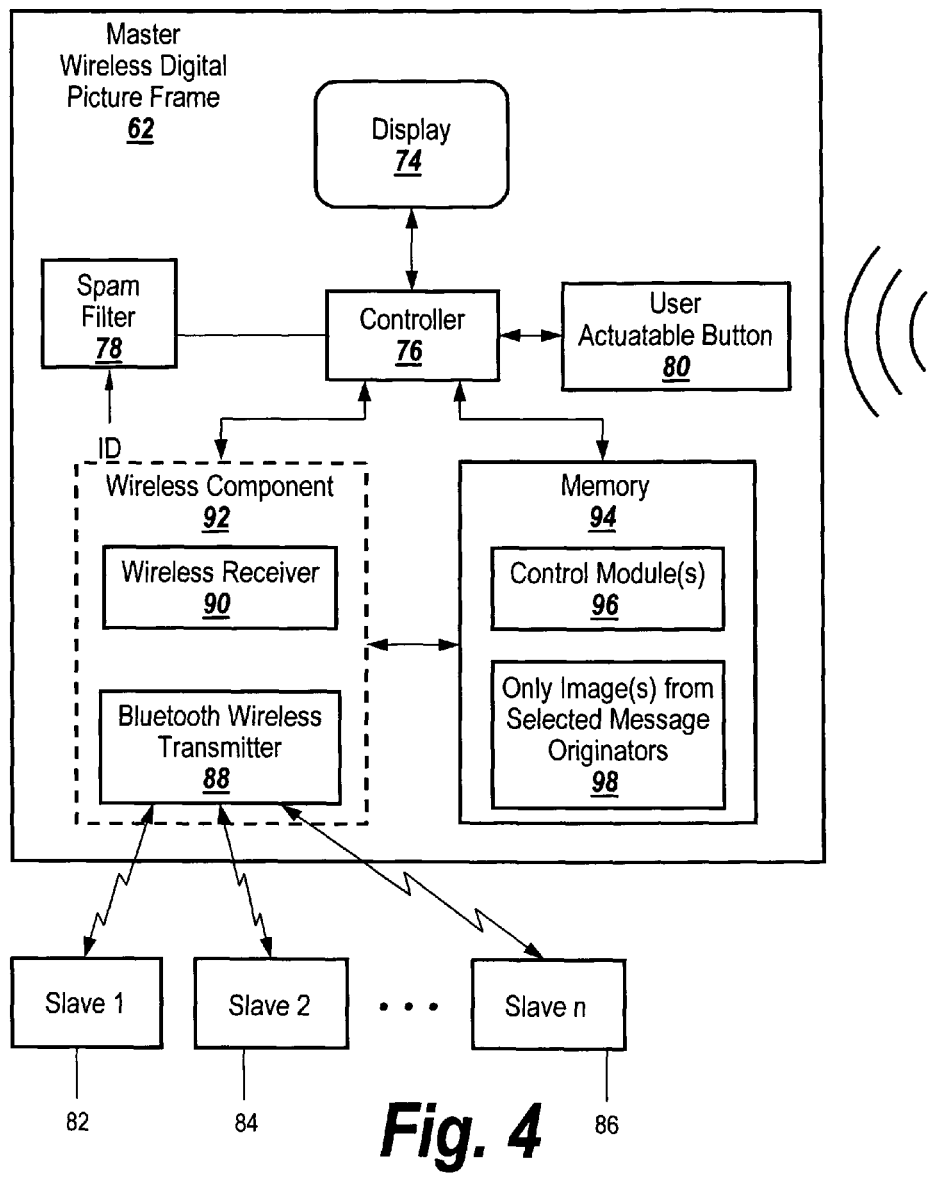
FIG. 4 is a diagrammatic illustration of the Master of FIG. 3 that includes a display and a spam filter coupled to a controller for preventing the transmission of unwanted pictures to a number of Slave devices.

Referring now to FIG. 4, in one embodiment Master 62 may include a display 74 coupled to a controller 76 to which a spam filter 78 is coupled that has been provided with the aforementioned preloaded ID list, against which incoming messages with source identification is compared. Master 62 is provided with a user actuatable button 80 which can be utilized to selectively transmit out the picture messages to one or more Slaves 82, 84 and 86 through the utilization of a Bluetooth wireless transmitter 88 in one embodiment.

As will be seen, both the Master units and the Slaves can be provided with user actuatable buttons, keyboards or the like to for instance specify what pictures are to be transmitted to what Slave and for the Slaves to be able to access selected picture messages from the Master. Thus, the Slaves can manually request updates, whereas the Master can be manually controlled to transmit only selected pictures to selected Slaves. Thus, as part of the subject invention there is manual control of the Master/Slave relationship so that for instance only certain Slaves are provided with recent wireless pictures. The manually controlled system also permits selecting which, if any, Slaves are to receive image transfers at all, whereas the Slaves may be manually controlled to request updates from the Master.

Referring back to FIG. 4, the Master unit which itself can be a wireless picture frame, is provided in one embodiment with a wireless receiver 90, the Bluetooth wireless transmitter 88 and a cellular wireless receiver 90, with these modules being the major components of a wireless component 92. Associated with Master 62 is a memory 94 and a controller module 96. Memory 94 stores the incoming picture messages. However, the only images that are outputted are those sent from selected message originators as illustrated at 98. The acceptable message originators are inputted in terms of the identification or ID of approved message originators entered at spam filter 78. Incoming picture messages and IDs are coupled through controller 76 to memory 94 and then to unit 98 which controls which picture messages can be transmitted to Slave units 82-86. It will be appreciated that in this embodiment the Slave units do not themselves have the ability to compare the picture source identification with a preloaded list. This is because spam filtering is accomplished at the Master unit.

Figure 5:
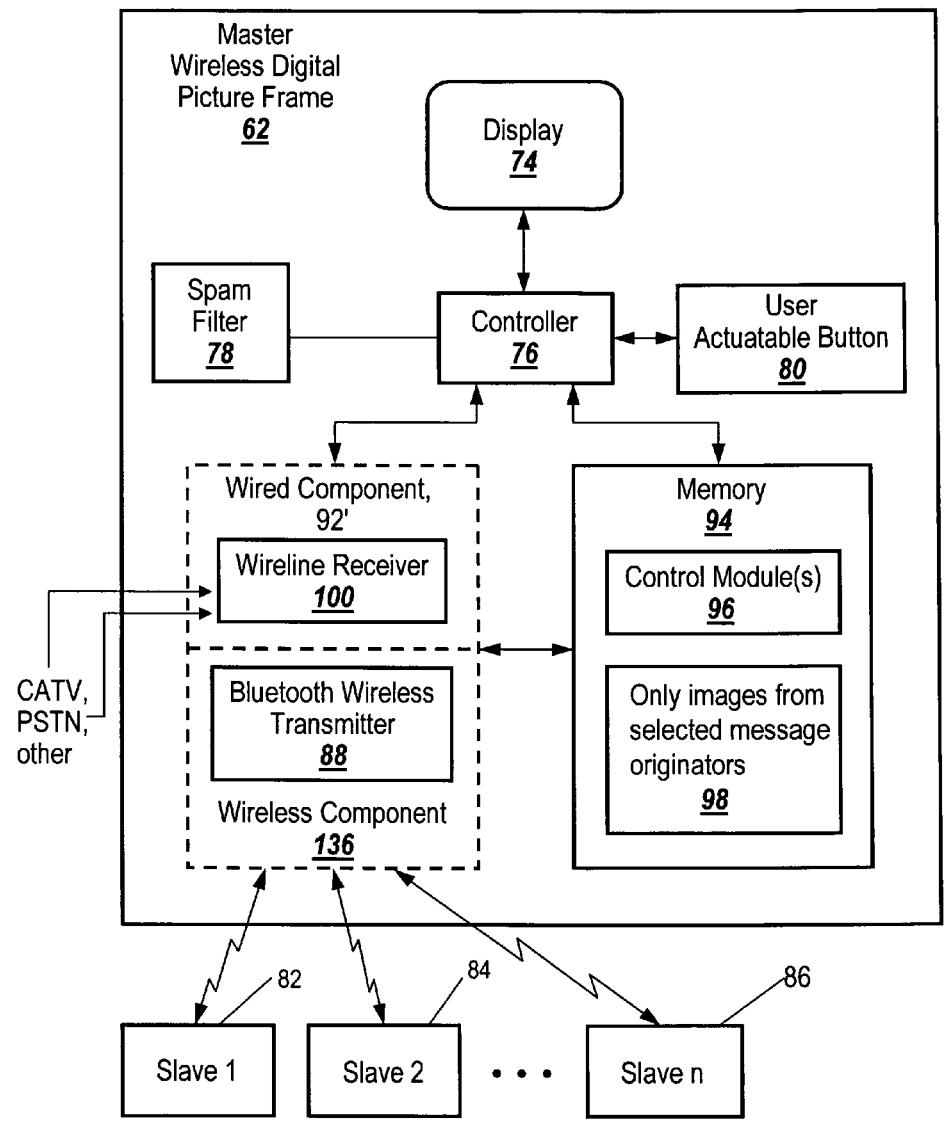
FIG. 5 is a diagrammatic illustration of the Master of FIG. 4, wherein the Master has a wire line receiver capable of receiving CATV, PSTN and other wire-line transmitted images, with the spam filter being able to inhibit wireless transmission of unwanted pictures to a number of Slaves.

Referring to FIG. 5 in which like reference characters are utilized to identify like elements; what can be seen is that rather than having a wireless receiver 90, what is provided in this embodiment is a wire line receiver 100 capable of receiving CATV, PSTN, and other wire line transmissions.

Thus, it can be seen that picture data can either be wirelessly transmitted to the Master unit or can be transmitted through a wire-line connection to the Master unit. Here the wired component is designated by reference character 92'.

The wireless component in this case is the wireless transmission from the Master unit to the Slaves.

Figure 6:
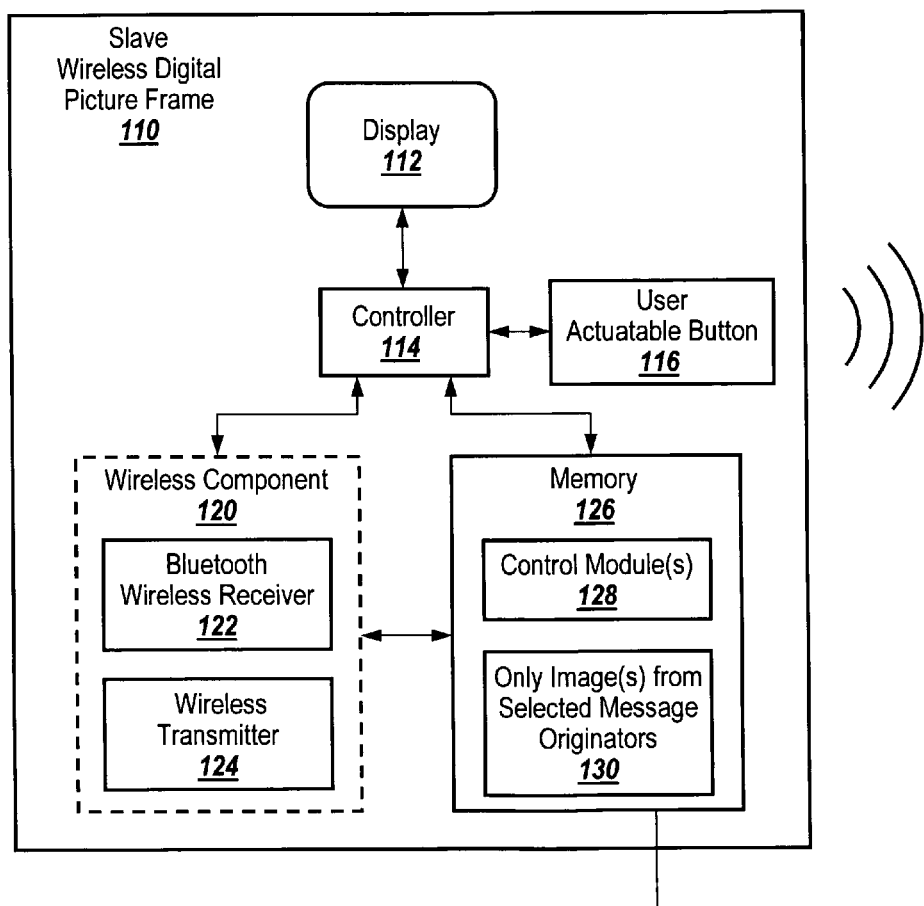
FIG. 6 is a diagrammatic illustration of the Slave of either FIG. 4 or FIG. 5 usable as a digital picture frame, illustrating the ability to wirelessly receive picture message data from the Master.

Referring to FIG. 6, what is shown is a Slave 110 which has its own display 112 and a controller 114 as well as a user actuatable switch 116 to poll the associated Master unit. The Slave has a wireless component 120 which in one embodiment includes a Bluetooth wireless receiver 122 for receiving the picture messages from the associated Master, and also includes a wireless transmitter 124 which may be utilized to communicate with the Master unit, for instance select what pictures are to be wirelessly transmitted to the Slave.

The Slave also has a memory 126, a control module 128 and a spam filter 130 which only allows images to be displayed from selected message originators. In this case while messages may have been previously filtered at the Master, Slave 110 can perform the filtering function itself.

Figure 7:
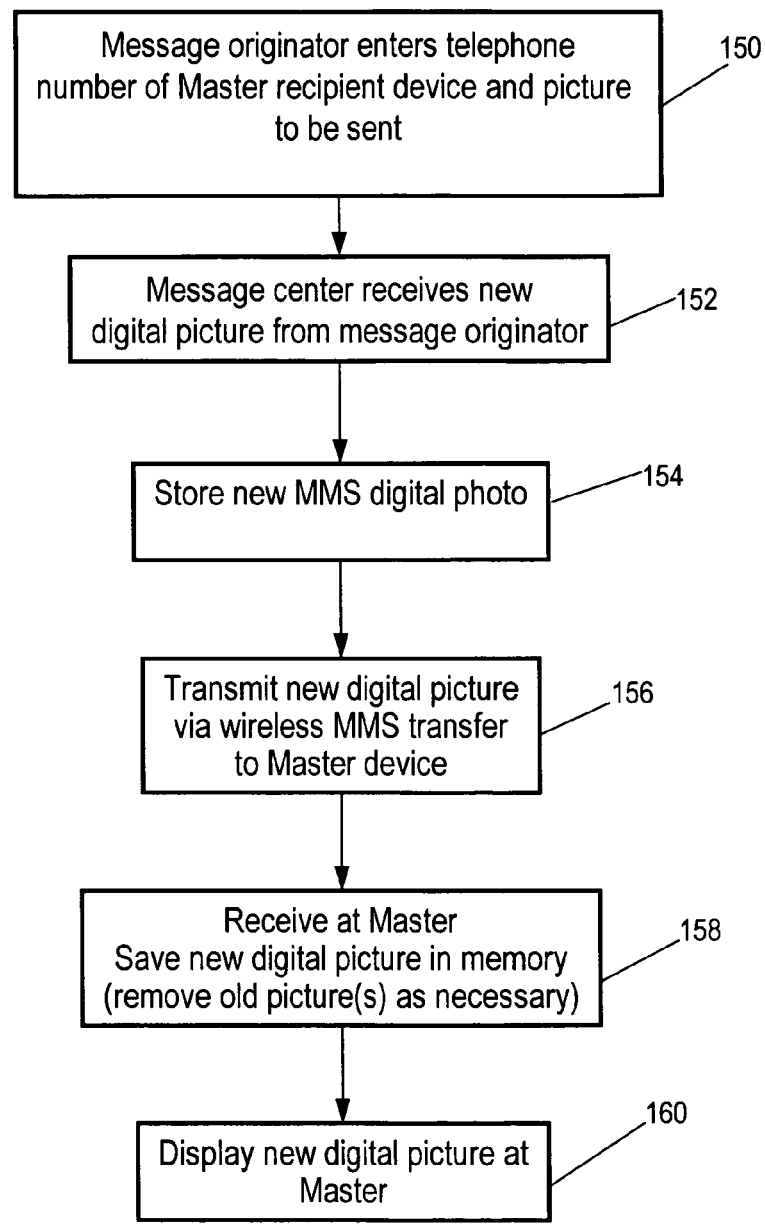
FIG. 7 is a flow chart showing the transmission of a picture message from a message originator who enters the telephone number of a Master recipient device to which the picture is to be sent, with a message center receiving and storing the picture message and wirelessly transmitting the picture message to the Master where the picture message is received and displayed; and, FIG. 8 is a flow chart illustrating the receipt of an image transfer request from a Slave, for the accessing of the requested image in a Master memory and a wireless transmission of the requested image from the Master memory to a Slave or other external device.

Referring now to FIG. 7, a flow chart for the subject system requires a message originator to enter the telephone number of a Master unit that is to receive picture message data, with the picture to be sent illustrated at 150. Thereafter, this information is transmitted to a message center 152 which receives the new digital picture data from the message originator and stores it as a new MMS digital photo as illustrated at 154. Thereafter, the new digital picture is transmitted via wireless MMS transfer as shown at 156, whereupon it is received at a Master unit 158 that saves the new digital picture in memory and removes old pictures as necessary. Finally, the new digital picture is displayed at the Master unit as illustrated at 160. All of this may occur with or without the image spam filtering described above. However, the flow chart shown in FIG. 7 illustrates that at least as far as wireless picture frames are concerned how one can transmit wireless picture imagery to a Master unit at which the picture message may be displayed if desired.

Figure 8:
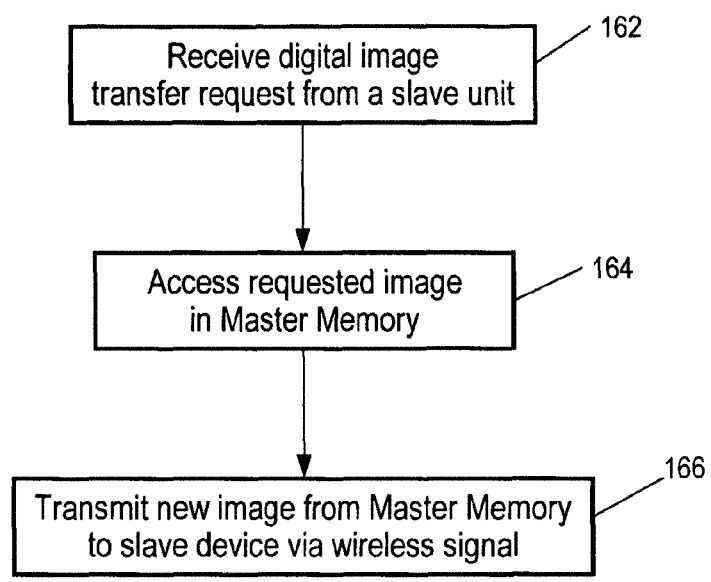

Referring to FIG. 8 at a Slave device, the Slave as illustrated at 162 requests the transmission of a digital image from the associated Master such that it receives a transfer of the digital image upon request.

As illustrated at 164, the requested images are accessed at the Master memory and are then transmitted from the Master memory to the Slave device as illustrated at 166.

What is set forth above is a description of what is currently believed to be the preferred embodiment or best example of the invention claimed. Future and present alternatives and modifications which make insubstantial changes in function, in purpose, in structure or in result are intended to be covered by the claims of this patent. Where alternative meanings are possible, the broadest meaning is intended. All words used in the claims are intended to be used in the normal, customary usage of grammar and the English language and are accorded their ordinary meanings.

While the inventions have been shown in only one of its forms, it is not thus limited but is susceptible to various changes and modifications without departing from the spirit thereof. The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. While the inventions have been particularly shown and described with reference to certain preferred embodiments, it will be understood by those skilled in the art that various modifications in form and detail may be made therein without departing from the scope and spirit of the inventions. Accordingly, modification to the preferred embodiments will be readily apparent to those skilled in the art, and the generic principles defined herein may be applied to other embodiments or applications without departing from the scope and spirit of the inventions.

What is claimed is:

1. A method of providing an alert related to a wireless picture message received from a message center, the method comprising:

allowing reception of a message from a message center on a wireless portable communication device having a touch display, the message including a non-facsimile picture and Caller ID automatically provided by a communications network that identifies the telephone number of a message originator;

generating an alert on the touch display on the wireless portable communication device, the alert including a graphical user interface and display of Caller ID; and, allowing use of the touch display by a message recipient to select and present the non-facsimile picture using the graphical user interface associated with the touch display.

2. A method as in claim 1 wherein the alert includes the duration of the message.

3. A method as in claim 1 wherein the message received at the portable wireless device includes a video message.

4. A method as in claim 1 wherein the time the message was received is included in the alert.

5. A method as in claim 1 wherein several message alerts are displayed together and further including the step of scrolling through the displayed message alerts prior to selection and display of the non-facsimile picture.

6. A method as in claim 1 wherein the received Caller ID is used to generate a signal for establishing communication with the message originator.

7. A method of providing an alert at a wireless device related to a picture message, the method comprising:
   allowing reception of a wireless message from a message center on a wireless portable communication device having a touch display, the message including a non-facsimile picture and Caller ID automatically provided by a communications network that identifies the telephone number of a message originator;
   comparing the Caller ID received in the message with a database contained in the wireless portable communication device;
   generating an alert on the touch display of the wireless portable communication device, the alert including a graphical user interface, and at least some data from the database resulting from a match between the received Caller ID and the database; and,
   allowing use of the touch display by a message recipient to select and present the non-facsimile picture using the graphical user interface associated with the touch display.

8. A method as in claim 7 wherein the generation of an alert also includes display of at least part of the Caller ID received in part of the message.

9. A method as in claim 7 wherein the at least some of the data is used to generate a signal to establish communication with a message originator.

10. A method as in claim 8 wherein at least part of the Caller ID is used to generate a signal to establish communication with a message originator.

11. A method as in claim 1 wherein the alert includes the duration of the message.

12. A method as in claim 7 wherein the alert includes the duration of the message.

13. A method as in claim 7 wherein the message received at a wireless portable device includes a video message.

14. A method as in claim 8 wherein the message received at a wireless portable device includes a video message.

15. A method as in claim 7 wherein the time the message was received is included in the alert.

16. A method as in claim 8 wherein the time the message was received is included in the alert.

17. A method as in claim 7 wherein several message alerts are displayed together and may be scrolled through prior to selection and display of the non-facsimile picture.

18. A method as in claim 8 wherein several message alerts are displayed together and may be scrolled through prior to selection and display of the non-facsimile picture.

19. A method as in claim 7 wherein the at least some data displayed from the matching step is a name.

20. A method as in claim 7 wherein the at least some data displayed from the matching step is a predefined visual image.

21. A method as in claim 1 wherein the message alert includes notification data that is configurable by a message recipient to actuate an LED.

22. A method as in claim 21 wherein the actuation of the LED indicates that the received message is from a particular group predetermined by the message recipient.

23. A method as in claim 22 wherein the predetermined group consists of work associates.

24. A method as in claim 22 wherein the predetermined group consists of family.

25. A method as in claim 22 wherein the predetermined group consists of friends.

26. A method as in claim 7 wherein the message alert includes notification data that is configurable by a message recipient to actuate an LED.

27. A method as in claim 26 wherein the actuation of the LED indicates that the received message is from a particular group predetermined by the message recipient.

28. A method as in claim 27 wherein the predetermined group consists of work associates.

29. A method as in claim 27 wherein the predetermined group consists of family.

30. A method as in claim 27 wherein the predetermined group consists of friends.

31. A method of providing an alert related to a wireless picture message received at a message center, the method comprising:
   receiving a wireless message at a message center, the message including non-facsimile picture and Caller ID data automatically provided by a communications network that identifies the telephone number of the message originator;
   generating an alert on a touch display on a portable wireless device, the alert including a graphical user interface, with display of Caller ID identifying the message originator; and
   allowing use of the touch display by a message recipient for selection and presentation of the non-facsimile picture on the touch display.

* * * * *